(12) United States Patent
Heemskerk et al.

(10) Patent No.: US 6,577,574 B1
(45) Date of Patent: Jun. 10, 2003

(54) METHOD OF REGISTERING A RUNNING TIME ON AN INFORMATION CARRIER, INFORMATION CARRIER AND APPARATUS

(75) Inventors: Jacobus P. J. Heemskerk, Eindhoven (NL); Jakob G. Nijboer, Eindhoven (NL); Joost J. J. Bekkers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/533,491

(22) Filed: Mar. 23, 2000

(30) Foreign Application Priority Data

Mar. 23, 1999 (EP) ............................................. 99200894

(51) Int. Cl.⁷ ............................................... G11B 7/00
(52) U.S. Cl. ................................ 369/59.23; 369/47.21; 369/275.4
(58) Field of Search ........................... 369/30.01, 30.04, 369/30.08, 30.12, 30.14, 30.19, 44.26, 44.33, 47.21, 47.22, 47.27, 59.24, 59.23, 53.2, 59.26, 275.3, 275.4

(56) References Cited

U.S. PATENT DOCUMENTS

| | | | |
|---|---|---|---|
| 5,150,113 A | * | 9/1992 | Bluthgen ............... 340/825.69 |
| 6,125,089 A | * | 9/2000 | Shigemori ............... 369/47.22 |
| 6,128,257 A | * | 10/2000 | Zhou et al. ............... 369/30.37 |
| 6,163,515 A | * | 12/2000 | Yamamoto ............... 369/47.21 |
| 6,339,561 B2 | * | 1/2002 | Yokota et al. ........... 369/30.08 |
| RE37,808 E | * | 7/2002 | Yokota ..................... 369/47.12 |
| 6,424,615 B1 | * | 7/2002 | Ishimura et al. ......... 369/275.3 |
| 6,438,084 B2 | * | 8/2002 | Kawashima et al. ..... 369/275.3 |

FOREIGN PATENT DOCUMENTS

EP           0265984 B1     5/1988

OTHER PUBLICATIONS

"Compact Disc Standards: An Introductory Overview", Jan Korst, Verus Pronk, Multimedia Systems (1994), pp. 157–171.

* cited by examiner

Primary Examiner—Thang V. Tran
Assistant Examiner—Bach Vuong
(74) Attorney, Agent, or Firm—Michael E. Belk

(57) ABSTRACT

Running time is registered on an information carrier that includes main data and subcode data. The running time is indicated in a subcode channel by a subcode time expressed in accordance with a predetermined format. A pseudo-running time is described by incrementing the subcode time in accordance with a pseudo-tempo, which is different from an actual tempo, the actual tempo representing a tempo in accordance with the actual running time.

24 Claims, 5 Drawing Sheets

METHOD OF REGISTERING A RUNNING TIME ON AN INFORMATION CARRIER, INFORMATION CARRIER AND APPARATUS

BACKGROUND OF THE INVENTION

1. Technical Field

The invention relates to a method of registering a running time on an information carrier, the information carrier comprising main data and subcode data, the running time being indicated in a subcode channel by a subcode time expressed in accordance with a predetermined format.

The invention also relates to a method of registering a running time of an information carrier, the running time being described by a subcode time in a subcode channel, the subcode time being expressed in minutes, seconds and frames, a number of bits for expressing the number of minutes of the subcode time being available in the subcode channel.

The invention further relates to an information carrier comprising main data, subcode data and tracks in which information is stored, the information carrier further comprising information about a running time of the information carrier, the running time being indicated in a subcode channel by a subcode time expressed in accordance with a predetermined format.

The invention further relates to an information carrier for recording and storing main data and subcode data in tracks, the information carrier further comprising a pre-groove in which information about a running time indicated by a subcode time and a pre-groove time is stored, both the subcode time and the pre-groove time being expressed in accordance with a predetermined format.

The invention further relates to an apparatus for reading an information carrier, comprising a system for detecting and reading information stored on the information carrier, the system comprising detection means and read-out means for receiving detector signals, the read-out means being arranged to retrieve a subcode time.

The invention further relates to an apparatus for recording an information carrier, comprising write means for inducing a detectable change on a layer of the information carrier, the write means being arranged to write a subcode time on the information carrier, which subcode time is incremented in accordance with an actual tempo, the actual tempo representing a tempo in accordance with the actual running time.

The method according to the invention may be used in several well-known information carriers, e.g. Compact-Disc (CD), Video-CD, CD-Recordable (CD-R) or CD-Rewritable (CD-RW).

2. Related Art

A method mentioned in the foregoing is known from the standard format description of the Compact Disc Digital Audio, well known to the person skilled in the art (see International Standard IEC 908).

In this standard format description, a high-density optical disc is described in detail. The digital information present in digital form on this disc is read out by means of an optical system. Using the EFM-modulation code and the CIRC error-correction system for storing information on the disc, an information carrier with reasonably good error-detection and error-correction possibilities is created. In order to create these possibilities, redundancies are used in the EFM-modulation code.

After demodulation, some bits are present for control and display purposes. With these bits, the standard format description of the Compact Disc defines eight additional channels of information or subcodes that are added to the music information; these subcode channels are called P, Q, R, S, T, U, V, W. One of the features of the Q-channel states the running time of the information carrier. The invention relates to this feature.

It should be noted that the Compact Disc Digital Audio is only to be taken as an example in the field of application of this invention. Other different CD formats can be used to apply this invention, e.g. Video-CD, CD-R or CD-RW. For example, in the CD-R or CD-RW, the running time as described below in detail is recorded in the so-called pre-groove in the ATIP (absolute time in pre-groove). For an overview of some relevant CD standards, see Compact disc standards: an introductory overview, Jan Korst, Verus Pronk, *Multimedia Systems* (1994) 2:157–171.

According to the standard format description of the Compact Disc Digital Audio, the running time on the disc is expressed in 6 digits in BCD-code. The fields AMIN, ASEC and AFRAME are each expressed in 2 digits. This has as the effect that the maximum value of the AMIN field is 99 minutes, resulting in a maximum running time of almost 100 minutes (in fact, 99 minutes, 59 seconds, 74/75 seconds, as will be further explained).

A person skilled in the art therefore learns from the standard format description that the running time of a Compact Disc is limited to 100 minutes, which is due to the fact that 2 digits are available for expressing the AMIN field.

In certain circumstances, it may be desirable to increase the possible maximum running time of the Compact Disc. The invention therefore has for its object to provide a running time registration with an increased possible maximum running time on an information carrier.

SUMMARY OF THE INVENTION

The method according to the invention is characterized in that a pseudo-running time is described by incrementing the subcode time in accordance with a pseudo-tempo, which is different from an actual tempo, the actual tempo representing a tempo in accordance with the actual running time.

The invention is based on the recognition that, by incrementing the subcode time at a pseudo-tempo which is different from an actual tempo, the actual tempo representing the actual running time of a Compact Disc as indicated by the subcode time is not limited to 100 minutes anymore. By using this pseudo-tempo, more flexibility in the maximum achievable running time is introduced.

Technical improvements have made it possible to increase the running time of a Compact Disc, starting from an initial value of approximately 72 minutes. Due to these improvements, the maximum possible subcode time of 99:59:74 may be a limiting factor to the running time of a Compact Disc. By introducing the proposed subcode time according to the invention, the subcode time ceases to be a limiting factor.

Another method according to the invention is characterized in that the pseudo-tempo is smaller than the actual tempo.

By using a pseudo-tempo that is smaller than the actual tempo, the subcode time exceeds the known limit of 100 minutes.

Another method according to the invention is characterized in that a first pseudo-tempo is equal to the actual tempo up to a predetermined subcode time, and that, starting from said predetermined subcode time, a second pseudo-tempo is smaller than the actual tempo.

Depending on the actual running time of an information carrier, it may be favorable to use a tempo which is equal to the actual tempo up to a predetermined subcode time and, after that subcode time, a tempo smaller than the actual tempo. In this way, the user of this information carrier has the correct information about the running time up to that subcode time. After that subcode time, the displayed running time information is not correct anymore.

If an information carrier has a total running time of 120 minutes, up to 80 minutes of the actual tempo is used, resulting in a correctly displayed running time information. After 80 minutes, a pseudo-time equal to half the actual tempo is used, resulting in a total possible subcode time of 120 minutes. It is clear therefrom that the choice of the pseudo tempo and the predetermined subcode time is dependent on the total running time of the information carrier used.

Another method according to the invention is characterized in that a first pseudo tempo is equal to the actual tempo up to a predetermined subcode time and that, starting from that predetermined subcode time, a second pseudo tempo is zero.

Instead of using a tempo smaller than the actual tempo, a zero tempo may also be used. This results in the subcode time being kept constant. Therefore, there is no limit to the running time of the information carrier anymore. The running time displayed is not in accordance with the actual running time of the information carrier, starting from the predetermined subcode time.

Another method according to the invention is characterized in that a control code is used, this control code indicating the use of a subcode time in accordance with a pseudo-tempo which is different from the actual tempo.

By using a control code, e.g. a pointer, in the subcode channel, the use of a subcode time which is different from the 'regular' subcode time can be indicated. This control code can be stored in the subcode time at the place where the 'regular' subcode time is abandoned. With this information, the apparatus reading the information carrier can, for example, display an additional sign indicating that the running time displayed does not correspond to the actual running time.

Another method according to the invention is characterized in that the pseudo-tempo is smaller than the actual tempo by expressing the subcode time in values exceeding the maximum possible values in accordance with the predetermined format.

By expressing the subcode time in values exceeding the maximum possible values in accordance with the predetermined format, the maximum possible running time is increased. The maximum possible values in accordance with this predetermined format are 59 for AMIN and 74 for AFRAME. Optimally use of the predetermined format with the subcode will result in a maximum value of 99 for AMIN and AFRAME. As the subcode addresses are in accordance with the predetermined format, there will be no problems when reading an information carrier with these subcode addresses.

Another method according to the invention is characterized in that the number of bits is increased by using bits, which are present in fields of the subcode channel, the field having a predefined purpose different from expressing the minutes of the subcode time.

In order to increase the running time, different subcode timing bits may also be used. Bits which are present in fields of the subcode channel can be used for expressing the minutes of the subcode time. These fields have a predefined purpose which differs from that for expressing the minutes of the subcode time.

The information carrier according to the invention is characterized in that a pseudo-running time is described by incrementing the subcode time in accordance with a pseudo-tempo, which is different from an actual tempo, the actual tempo representing a tempo in accordance with the actual running time.

Another information carrier according to the invention is characterized in that a pseudo-running time is described in the pre-groove by incrementing the subcode time in accordance with a pseudo-tempo, which is different from an actual tempo, the actual tempo representing a tempo in accordance with the actual running time.

The apparatus according to the invention is characterized in that the read-out means are further arranged to detect a control code indicating the presence of a subcode time which is incremented in accordance with a pseudo-tempo, which is different from an actual tempo, the actual tempo representing a tempo in accordance with the actual running time.

Another apparatus according to the invention is characterized in that the write means are further arranged to write a subcode time on the information carrier, which subcode time is incremented in accordance with a pseudo-tempo which is different from an actual tempo.

BRIEF DESCRIPTION OF THE DRAWINGS

The invention will be further described in the following Figure description in which.

DETAILED DESCRIPTION OF THE INVENTION

Figure 1:
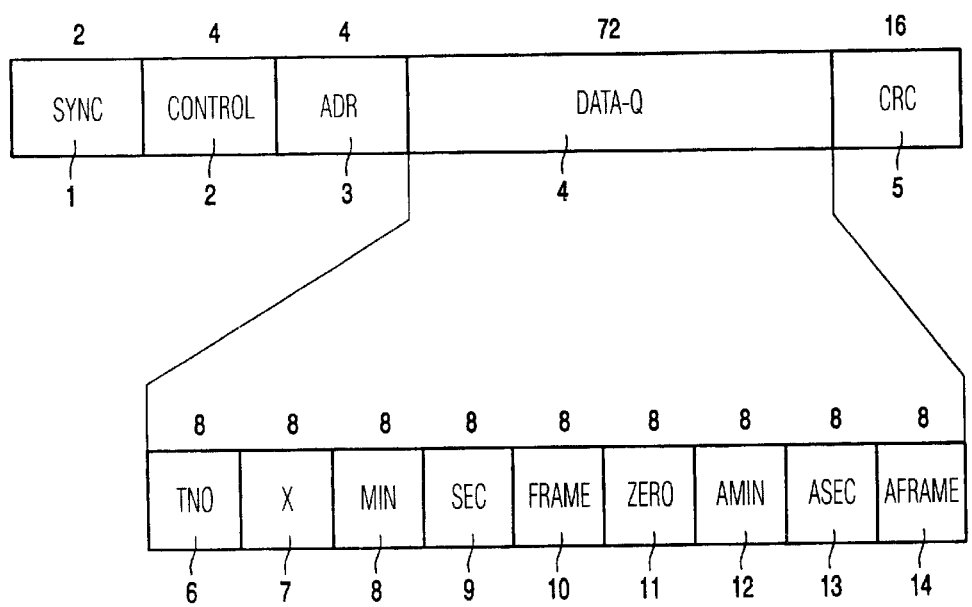
FIG. 1 shows the general data format of the channel Q.

The data format of channel Q is given in FIG. 1. In order to explain this Figure, some background information about this channel is given first.

A substantial amount of information is added to the data before the compact disc is recorded. After applying the so-called CIRC encoding, well known to a person skilled in the art, control words are added to the data. One 8-bit control & display word is added to every 32-symbol block of data (a symbol is an 8-bit word). The standard format description of the Compact Disc defines eight additional channels of information or subcodes that can be added to the music information; these subcodes are called, P, Q, R, S, T, U, V, W. The invention as described is related to the Q-channel. More detailed information about the use of the other subcode channels can be found in International Standard IEC 908.

The Q-channel is used for control purposes of more sophisticated players. The decoding of this channel can be implemented with a $\mu$-computer. Items like track number and time are encoded in channel Q. Each subcode word is 98 bits long, so that 98 frames must be read from the disc to read a complete subcode word. The data format of channel Q is given in FIG. 1.

The upper part of FIG. 1 shows the general data format, the lower part of FIG. 1 specifies the data-Q part. The 98-bit long Q subcode word consists of 5 parts:

A sync-pattern 1 (2 bits). This pattern is necessary to allow the decoder to distinguish the Q subcode word in a block from the audio information.

A CONTROL field 2 (4 bits). This control field 2 contains 4 flag bits to define the kind of information in a track.

An ADR field 3 (4 bits). This ADR field 3 indicates the mode of the subsequent data to follow.

A DATA-Q field 4 (72 bits). This DATA-Q field includes the actual control & display information.

A CRC field 5 (16 bits). This CRC field 5 comprises an error-correction code calculated on control, address and data information.

As the invention is related to the data format of the channel Q in the lower part of FIG. 1, the DATA-Q is explained in more detail. The DATA-Q field comprises 9 fields of 8-bit length, which are:

A TNO field 6. In this TNO field 6, the track number is expressed in 2-digit BCD-code.

An X field 7. In this X field, an index to track number expressed in the TNO field 6 is present.

The MIN field 8, the SEC field 9 and the FRAME field 10 indicate the running time within a track; each field is expressed in 2-digit BCD-code. The time is set to zero at the start of a track. Time increases in the music and decreases in the pause, ending with the value of zero at the end of the pause. In the lead-in and lead-out tracks, the time increases. The minutes are stored in MIN, the seconds in SEC and one second is subdivided into 75 FRAMEs (running from 00 to 74).

The ZERO field 11 contains eight bits with the value of zero.

The AMIN field 12, the ASEC field 13 and the AFRAME field 14 indicate the running time of a disc; each field is expressed in 2-digit BCD-code. At the starting diameter of the program area, the running time is set to zero and TNO takes the value of the first track on the disc. The minutes are stored in AMIN, the seconds in ASEC and one second is subdivided into 75 AFRAMEs (running from 00 to 74).

Figure 2:
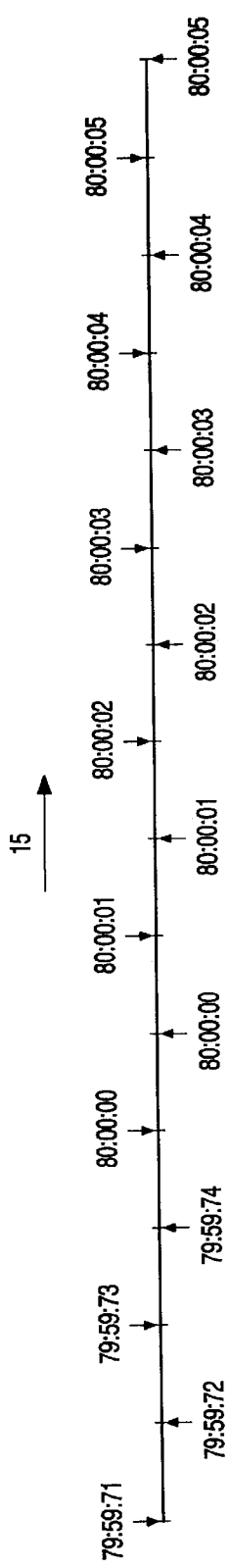
FIG. 2 shows a first embodiment of the invention.

FIG. 2 shows a first embodiment of the invention. In order to increase the possible running time, each subcode address is repeated once, the subcode enters some kind of 'stutter' mode. As a result, the subcode time increases twice more slowly than the real time does. Although addresses are not unambiguous anymore, any part of the information carrier is still accessible.

This can also be applied to an information carrier where the 'stutter' mode commences after some time, e.g. on a 120-min disc the conventional subcode is used during the first 80 minutes and the 'stutter' mode is used for the next 40 minutes. FIG. 2 shows a part of the subcode according to this embodiment. The subcode is indicated for 15 consecutive frames. Arrow 15 points into the direction of increasing running time when reading an information carrier. FIG. 2 shows the subcode entering this 'stutter' mode at the subcode address 80:00:00. Starting from this subcode time, each subcode address is repeated once, resulting in a twice slower increment of the subcode time.

In addition, a special pointer indicating the use of this 'stutter' mode can be defined in the subcode. Among other things, this pointer can indicate the subcode time after which the 'stutter' mode is used.

Figure 3:
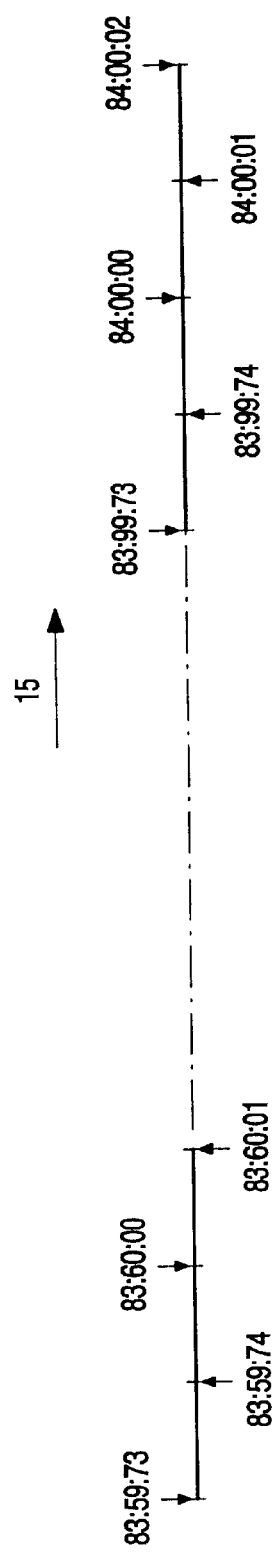
FIG. 3 shows a second embodiment of the invention.

FIG. 3 shows a second embodiment of the invention. In this second embodiment, the expression of the AMIN field 12, ASEC field 13 and AFRAME field 14 fields in 2 digits is used optimally in order to prolong the possible maximum running time. The maximum value of the ASEC field 13 is increased from the regular value of 59 to the BCD-code-related maximum value of 99. The possible maximum running time is increased by 66% with this sole measure (instead of a maximum running time of 6000 seconds, a maximum of 10000 seconds is realized). FIG. 3 shows two parts of the subcode addresses indicating this measure.

It can be easily understood that, instead of using the ASEC field 13 optimally, also the AFRAME field 14 can be used optimally by using the BCD-code related maximum value of 99 instead of the regular value of 74.

Figure 4:
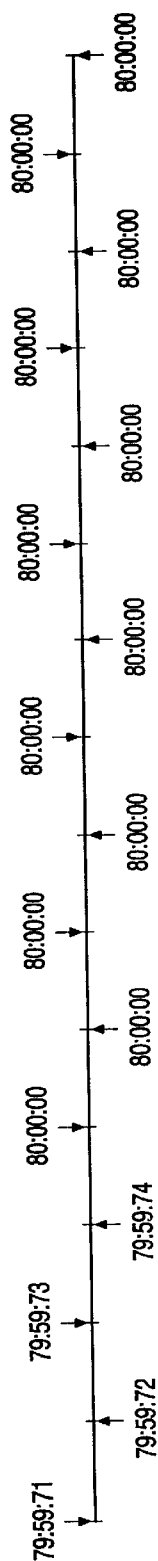
FIG. 4 shows a third embodiment of the invention.

FIG. 4 shows a third embodiment of the invention. In order to increase the possible running time, the subcode time is kept constant after some predetermined subcode time, e.g. after 99 minutes, 59 seconds and 74 frames, i.e. the maximum possible subcode time according to International Standard IEC 908. In this way, the possible running time is obviously unlimited. The subcode enters in some kind of 'clamping' mode. In FIG. 4, the subcode time enters this 'clamping' mode at the subcode address 80:00:00.

In addition, also in this embodiment, a special pointer indicating the use of this 'clamping' mode can be defined in the subcode. Among other things, this pointer can indicate the subcode time after which the 'clamping' mode is used.

Figure 5:
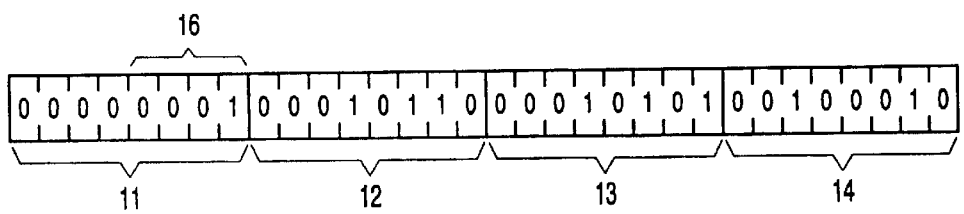
FIG. 5 shows a fourth embodiment of the invention.

FIG. 5 shows a fourth embodiment of the invention. In order to increase the possible running time, four bits 16 of the ZERO field 11, immediately preceding the bits of the AMIN field 12, representing the minutes of the subcode time in 2-digit BCD-code, can be 'sacrificed'. Due to these extra four bits, an extra digit becomes available for expressing the minutes of the subcode time. The maximum number of minutes is therefore increased to 999 minutes instead of 99 minutes.

In this way, the ZERO bits are only used as AMIN bits if the total running time of a disc exceeds 100 minutes. Up to a running time of 100 minutes, all ZERO field bits remain zeros; as from a running time of 100 minutes, the ZERO field bits are very gradually used as extra AMIN bits. Up to a playing time of 200 minutes, only one ZERO field bit is used as AMIN bit (up to a playing time of 400 minutes, only two ZERO field bits are used as AMIN bit; up to a playing time of 800 minutes, only three ZERO field bits are used as AMIN bit).

As an example, FIG. 5 shows a subcode address according to this embodiment. The subcode address shown here is 103:15:22, 103 minutes, 15 seconds and 22 frames in BCD-code.

The embodiments shown in FIGS. 2, 3, 4 and 5 may be used in several different Compact Disc formats, e.g. CD Digital Audio. They may also be used in CD-R or CD-RW, where the subcode addresses are written in the pre-groove in the ATIP field while manufacturing the disc (for information about this pre-groove, see European Patent Specification EP 0 265 984 B1) and in the AMIN field, ASEC field and AFRAME field while recording information on the CD-R or CD-RW. The subcode addresses written in the AMIN fields, ASEC fields and AFRAME fields are written in the same way as indicated in International Standard IEC 908. The time indicated in the ATIP field should be identical to the time indicated in the AMIN field, ASEC field and AFRAME field. The ATIP field uses a slightly different time indication, with the result that the maximum value of the ATIP field is 79:59:74. The maximum running time of an information carrier using this ATIP field is therefore limited to 80 minutes. This invention increases the maximum running time to a value above this 80-minute barrier.

Figure 6:
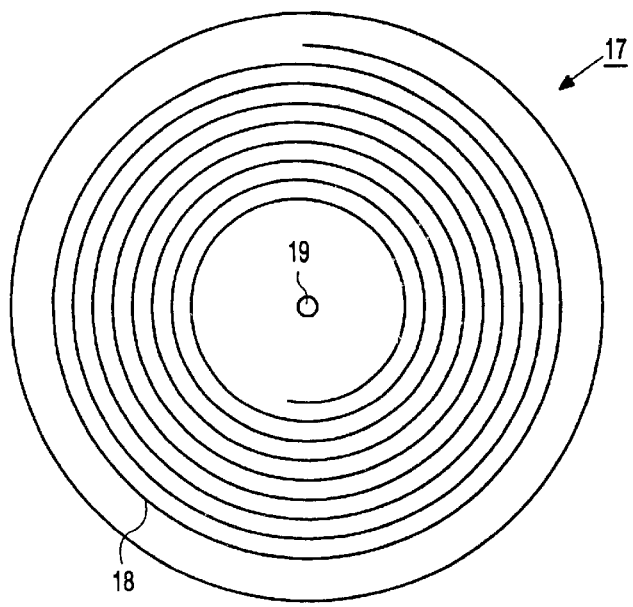
FIG. 6 shows an information carrier according to the invention.

FIG. 6 shows, as an example, an information carrier 17 according to the invention. This information carrier has a pre-groove 18 for storing the information present on the carrier and a central opening 19. The pre-groove comprises the subcode information according to the invention. This information carrier may be a CD-R or a CD-RW. Also other CD formats (e.g. CD Digital Audio) may be used in this invention.

Figure 7:
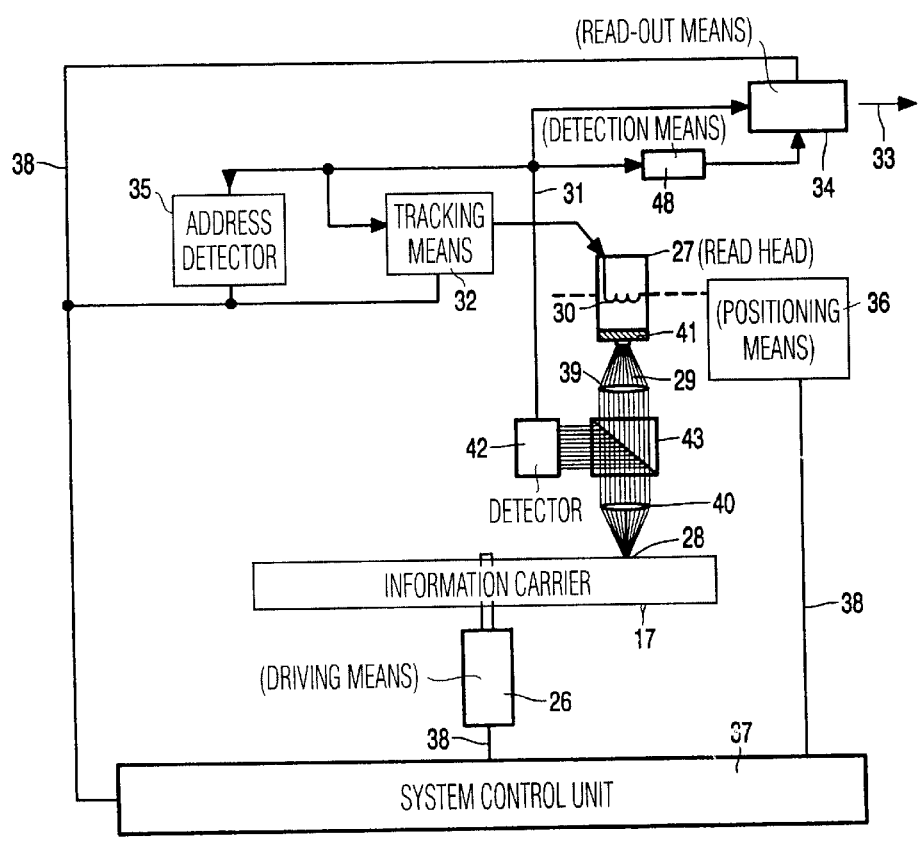
FIG. 7 shows an apparatus according to the invention.

FIG. 7 shows an apparatus according to the invention for reading the information carrier 17 with the subcode according to the invention and for writing the subcode according to the invention on the information carrier. The apparatus comprises driving means 26 for rotating the information carrier 17 and a read head 27 for reading the tracks present on the information carrier. The read head 27 comprises an optical system of a known type to focus a light spot 28 on a track by means of a beam of light 29 guided through optical elements like a collimator lens 39, to collimate the beam of light, and an objective lens, to focus the beam of light. This beam of light 29 originates from a radiation source 41, e.g. an infrared laser diode with a wavelength of 650 nm and an optical output of 1 mW. The read head 27 further comprises a tracking actuator for fine-positioning the light spot 28 in the radial direction in the middle of the track. Adjusting the position of the light spot to the position of the track can also be achieved by changing the position of the objective lens 40.

After being reflected by the information carrier 17, the beam of light 29 is detected by a detector 42 of a known type, e.g. a quadrant detector and generates detector signals 31 including a read signal, a tracking-error signal, a focussing-error signal, a synchronization signal and a lock-in signal. E.g. a beam-splitting cube 43, a polarizing beam-splitting cube, a pellicle or a retarder may be used for this purpose. The apparatus further comprises tracking means 32 connected to the read head 27 for receiving the tracking-error signal of the read head 27 and for steering the tracking actuator 30. When the information carrier 17 is being read, the read-out signal is converted in the read-out means 34 into output information 33, the read-out means comprising, for example, a channel decoder or an error-corrector. The running time can be displayed with the output information 33. By using a pointer present in the subcode addresses, the read-out means can also convert the read-out signal into output information, in order to be able to display the running time if the subcode addresses are incremented according to the invention. The apparatus further comprises an address detector 35 for retrieving the addresses from the detector signals 31 and positioning means 36 for coarse positioning the read head 27 in the radial direction of the track. The apparatus further comprises detection means 48 for receiving the detector signals 31 from the read head 27. The detector signals 31 are used by the detection means 48 for synchronizing the read-out means 34. The apparatus further comprises a system control unit 37 for receiving commands from a controlling computer system or a user and for regulating the apparatus by means of control lines 38, e.g. a system bus connected to the driving means 26, the positioning means 36, the address detector 35, the tracking means 32 and the read-out means 34.

In another embodiment, the apparatus may also comprise write means for applying optically readable signs on the information carrier 17 of a recordable or rewritable type. The read head 27 is replaced by a read/write head 27. In this embodiment, this read/write head 27 comprises the write means.

Whilst the invention has been described with reference to preferred embodiments thereof, it is to be understood that these are non-limitative examples. Thus, various modifications may become apparent to those skilled in the art, without departing from the scope of the invention, as defined in the claims.

Furthermore, the invention resides in each and every novel feature or combination of features.

What is claimed is:

1. A method of registering a running time on an information carrier, the method comprising providing the information carrier, the information carrier including main data and subcode data, the running time being indicated in a subcode channel by a subcode time expressed in accordance with a predetermined format, a pseudo-running time is described by incrementing the subcode time in accordance with a pseudo-tempo, which is different from an actual tempo, the actual tempo representing a tempo in accordance with the actual running time.

2. The method of claim 1, in which the pseudo-tempo is smaller than the actual tempo.

3. The method of claim 2, in which the pseudo-tempo is equal to half the actual tempo.

4. The method of claim 1, in which a first pseudo-tempo is equal to the actual tempo up to a predetermined subcode time, and that, starting from the predetermined subcode time, a second pseudo-tempo is smaller than the actual tempo.

5. The method of claim 4, in which the second pseudo-tempo is equal to half the actual tempo.

6. The method of claim 2, in which a first pseudo-tempo is equal to the actual tempo up to a predetermined subcode time, and that, starting from the predetermined subcode time, a second pseudo-tempo is zero.

7. The method of claim 6, in which the predetermined subcode time is or approximately is 99:59:74.

8. The method of claim 6, in which a control code is used, this control code indicating the use of a subcode time in accordance with a pseudo-tempo which is different from the actual tempo.

9. The method of claim 2, in which the pseudo-tempo is smaller than the actual tempo by expressing the subcode time in values exceeding the maximum possible values in accordance with the predetermined format.

10. A method of registering a running time of an information carrier, the method comprising providing the information carrier, the running time being described by a subcode time in a subcode channel, the subcode time being expressed in minutes, seconds and frames, a number of bits for expressing the number of minutes of the subcode time being available in the subcode channel, the number of bits is increased by using extra bits other than subcode timing bits, the extra bits being present in at least one field of the subcode channel, the at least one field of the subcode channel having a predefined purpose which is different from that for expressing the minutes of the subcode time.

11. The method of claim 10, in which the extra bits include bits of a ZERO field which immediately precede the bits representing the minutes of the subcode time.

12. The method of claim 10, in which a control code is used, this control code indicating the use of bits which are present in fields of the subcode channel, the field having a predefined purpose which is different from that for expressing the minutes of the subcode time.

13. An information carrier comprising main data, subcode data and tracks in which information is stored, the information carrier further comprising information about a running time of the information carrier, the running time being indicated in a subcode channel by a subcode time expressed in accordance with a predetermined format, a pseudo-running time is described by incrementing the subcode time in accordance with a pseudo-tempo, which is different from an actual tempo, the actual tempo representing a tempo in accordance with the actual running time.

14. An information carrier for recording and storing main data and subcode data in tracks, the information carrier comprising a pre-groove in which information about a running time indicated by a subcode time and a pre-groove time is stored, both the subcode time and the pre-groove time being expressed in accordance with a predetermined format, a pseudo-running time is described in the pre-groove by incrementing the subcode time in accordance with a pseudo-tempo, which is different from an actual tempo, the actual tempo representing a tempo in accordance with the actual running time.

15. An information carrier comprising main data, subcode data and tracks in which information is stored, the information carrier further comprising information about a running time of the information carrier, the running time being indicated in a subcode channel by a subcode time expressed in minutes, seconds and frames, a number of bits for expressing the number of minutes of the subcode time being available in the subcode channel, the number of bits is increased by using extra bits other than subcode timing bits, the extra bits being present in at least one field of the subcode channel, the at least one field of the subcode channel having a predefined purpose which is different from that for expressing the minutes of the subcode time.

16. An information carrier comprising main data, subcode data and tracks in which information can be stored, the information carrier further comprising information about a running time indicated by a subcode time stored in a pre-groove, the subcode time being expressed in minutes, seconds and frames, a number of bits for expressing the number of minutes of the subcode time being available in the subcode channel, the number of bits is increased by using extra bits other than subcode timing bits, the extra bits being present in at least one field of the subcode channel, the at least one field of the subcode channel having a predefined purpose which is different from that for expressing the minutes of the subcode time.

17. An apparatus for reading an information carrier, comprising a system for detecting and reading information stored on the information carrier, the system including detection means and read-out means for receiving detector signals, the read-out means being arranged to retrieve a subcode time, characterized in that the read-out means are further arranged to detect a control code indicating the presence of a subcode time which is incremented in accordance with a pseudo-tempo, which is different from an actual tempo, the actual tempo representing a tempo in accordance with the actual running time.

18. An apparatus for recording an information carrier, comprising write means for inducing a detectable change on a layer of the information carrier, the write means being arranged to write a subcode time on the information carrier, which subcode time is incremented in accordance with an actual tempo, the actual tempo representing a tempo in accordance with the actual running time, characterized in that the write means are further arranged to write a subcode time on the information carrier which subcode time is incremented in accordance with a pseudo-tempo which is different from an actual tempo.

19. The method of claim 4, in which the predetermined subcode time is or approximately is 80:00:00.

20. The method of claim 5, in which the predetermined subcode time is or approximately is 80:00:00.

21. The carrier of claim 13, in which the pseudo-tempo is smaller than the actual tempo.

22. The carrier of claim 14, in which the pseudo-tempo is smaller than the actual tempo.

23. The carrier of claim 13, in which a first pseudo-tempo is equal to the actual tempo up to a predetermined subcode time, and that, starting from the predetermined subcode time, a second pseudo-tempo is zero.

24. The carrier of claim 14, in which a first pseudo-tempo is equal to the actual tempo up to a predetermined subcode time, and that, starting from the predetermined subcode time, a second pseudo-tempo is zero.

* * * * *